(12) United States Patent
Becker et al.

(10) Patent No.: US 7,047,484 B1
(45) Date of Patent: May 16, 2006

(54) METHOD, SYSTEM, AND APPARATUS FOR PROVIDING ACCESS TO ASYNCHRONOUS DATA IN A SPREADSHEET APPLICATION PROGRAM

(75) Inventors: Andrew J. Becker, Bellevue, WA (US); Jason M. Cahill, Redmond, WA (US); Aleksandr M. Slepak, Redmond, WA (US); Jason P. Allen, Sammamish, WA (US); Jesse R. Bedford, Redmond, WA (US); Timothy Ahlers, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 793 days.

(21) Appl. No.: 09/982,122

(22) Filed: Oct. 18, 2001

(51) Int. Cl.
*G06F 15/00* (2006.01)

(52) U.S. Cl. .................. 715/503; 715/504; 715/505; 719/318; 719/315; 709/203

(58) Field of Classification Search ............... 715/503, 715/504, 505; 709/203, 231; 719/315, 318
See application file for complete search history.

(56) References Cited

U.S. PATENT DOCUMENTS

| | | | | |
|---|---|---|---|---|
| 5,371,675 A * | 12/1994 | Greif et al. | ........... | 715/503 |
| 5,729,745 A * | 3/1998 | Reina et al. | ........... | 719/315 |
| 5,826,253 A * | 10/1998 | Bredenberg | ........... | 707/2 |
| 6,115,040 A * | 9/2000 | Bladow et al. | ........... | 715/741 |
| 6,157,934 A * | 12/2000 | Khan et al. | ........... | 715/503 |
| 6,230,200 B1 * | 5/2001 | Forecast et al. | ........... | 709/226 |
| 6,505,175 B1 * | 1/2003 | Silverman et al. | ........... | 705/37 |
| 6,701,485 B1 * | 3/2004 | Igra et al. | ........... | 715/503 |
| 2002/0129054 A1 * | 9/2002 | Ferguson et al. | ........... | 707/503 |
| 2002/0184247 A1 * | 12/2002 | Jokela et al. | ........... | 707/204 |
| 2002/0188629 A1 * | 12/2002 | Burfoot | ........... | 707/503 |
| 2004/0080528 A1 * | 4/2004 | Rand et al. | ........... | 345/738 |
| 2004/0221289 A1 * | 11/2004 | D'Souza et al. | ........... | 718/102 |

OTHER PUBLICATIONS

Stewart Mckie, "Notification Systems", published Feb. 1997, pp. 1-6.*
Orphaned Spreadsheets Race for Real Time Market; M.N. Duffy; *Wall Street & Technology*, vol. 12, No. 5, (Nov. 1994), pp. 14, 16, 18.
SSP: A Semantics-Based Protocol for Real-Time Data Access; Tei-Wei Kuo and Aloysius K. Mok; *Proceedings of the Real-Time Systems Symposium*, 1993, pp. 76-86.

(Continued)

*Primary Examiner*—William Bashore
*Assistant Examiner*—Thu Vy Huynh
(74) *Attorney, Agent, or Firm*—Merchant & Gould

(57) ABSTRACT

A method, system, and apparatus for providing access to asynchronous data in a spreadsheet application program is provided. When a request is received to utilize an asynchronous data element in a spreadsheet, the spreadsheet application program instructs an asynchronous data server to provide updated values for the asynchronous data element. When the asynchronous data server program receives an updated value, it notifies the spreadsheet application program that a changed value for the data element is available. The next time the spreadsheet application program has idle processing time following a notification that an update is available, the spreadsheet application program determines whether a notification has been received from the asynchronous data server program. If an update is available, the spreadsheet application program contacts the asynchronous data server and requests the update. In response, the asynchronous data server program transmits the update to the spreadsheet application program.

26 Claims, 8 Drawing Sheets

OTHER PUBLICATIONS

The Design and Implementation of a Real-Time Object Management Interface; Tei-Wei Kuo and Aloysius K. Mok; *Symposium on Real-Time Technology and Applications* (1995), pp. 192-201.

Real-Time Database—Similarity Semantics and Resource Scheduling; Tei-Wei Kuo and Aloysius K. Mok; *SIGMOD Record*, vol. 25, No. 1 (Mar. 1996), pp. 18-22.

An Evaluation of Real-Time Transaction Management Issues in Mobile Database Systems; Ersan Kayan and Özgür Ulusoy; *The Computer Journal*, vol. 42, No. 6, 1999, pp. 501-510.

An Historical Information Spreadsheet for Power System Operation; B.E. Zunser, C.D. Meier, H.J. Warner, K. Hemmaplardh, S.A. Sackett, D. Williamson, and D. Vartuli; *IEEE Transactions On Power Systems*; vol. PWRS-1, No. 4 (Nov. 1986), pp. 238-242.

Interfacing Spreadsheet Programs to Real-Time Data Systems; Carl Scott, Ruth Clowers, and Mark Cross; *Proceedings of the International Symposium on Instrumentation in the Aerospace Industry, Instrument Society of America, USA*; pp. 39-45.

\* cited by examiner

METHOD, SYSTEM, AND APPARATUS FOR PROVIDING ACCESS TO ASYNCHRONOUS DATA IN A SPREADSHEET APPLICATION PROGRAM

TECHNICAL FIELD

The present invention generally relates to the field of asynchronous data communications. More specifically, but not by way of limitation, the present invention relates to a method, system, and apparatus for accessing asynchronous data in a spreadsheet application program.

BACKGROUND OF THE INVENTION

Spreadsheet application programs allow the manipulation of numeric and string data in a grid of rows and columns of cells. The value of a particular cell can be calculated based upon a formula which may include the values of other cells. Typically, the value of a cell is recalculated whenever a value of another cell upon which it depends changes. Moreover, different formats may be applied to different cells or groups of cells. Because of their ease of use and powerful features in processing and analyzing numerical data, spreadsheet application programs are widely used in the financial and scientific communities.

Spreadsheet application programs are equipped to easily handle most types of numerical and string data. However, current spreadsheet application programs are not equipped to handle asynchronous data in an easy or robust manner. Asynchronous data is data that does not change on a regular, determinable basis. For instance, one type of asynchronous data is real-time stock price data. The price of a stock may change constantly over the course of a day, or it may not change at all. Prior art solutions for handling asynchronous data in spreadsheet application programs have a number of serious shortcomings that cause it to be very difficult to integrate asynchronous data into a spreadsheet.

One previous method for accessing asynchronous data in a spreadsheet application program utilizes a "push" mechanism to transfer asynchronous data to the spreadsheet application program. With a push mechanism, asynchronous data is "pushed" from its source into the spreadsheet application program as the data becomes available. While this type of mechanism works for some applications, it does suffer from a number of problems that limit its usefulness.

One problem with push mechanisms is that they often try to push data into the spreadsheet application program when the spreadsheet application program is not ready for the data. For instance, the spreadsheet application program may be busy doing a calculation or displaying a modal dialog box. In such a situation, the spreadsheet application program will usually fail to receive the data. This is particularly problematic for time critical data that is ignored if the push occurs while the spreadsheet application program is busy and unable to receive the asynchronous data.

Another previous method for accessing asynchronous data in a spreadsheet application program utilizes a "pull" mechanism to transfer asynchronous data to the spreadsheet application program. With a pull mechanism, the spreadsheet application program periodically queries the source of the asynchronous data for updates. The pull mechanism solves the problem with push mechanisms described above because the spreadsheet application program is always ready to receive the data after making a request. However, the pull mechanism suffers from another drawback in that the spreadsheet application program will request asynchronous data even when no data is available. Constantly requesting data in this manner is computationally expensive. Moreover, changes in the asynchronous data may be missed by the spreadsheet application program if the data change occurs between requests. Accordingly, the pull mechanism for transferring asynchronous data into a spreadsheet application program is also problematic.

Therefore, in light of the above, there is a need for a method and system for providing access to asynchronous data in a spreadsheet application program in which a request for asynchronous data is not made if no data is available. Moreover, there is a need for a method and system for providing access to asynchronous data in a spreadsheet application program that allows a spreadsheet application program to be notified that data is available, even when the spreadsheet application program is busy performing other processing, and that will not result in lost data if the notification is made while the spreadsheet application program is busy performing other processing.

SUMMARY OF THE INVENTION

The present invention solves the above-described problems by providing a method, system, and apparatus for providing access to asynchronous data in a spreadsheet application program that does not request asynchronous data if none is available. Moreover, the present invention solves the above-described problems by providing a method, system, and apparatus for providing access to asynchronous data in a spreadsheet application program that allows a spreadsheet application program to be notified that data is available even when the spreadsheet application program is busy performing other processing. In this manner, the method, system, and apparatus provided by the present invention does not miss data that becomes available while the spreadsheet application program is performing other processing.

Generally described, the present invention provides a hybrid push-pull mechanism for facilitating the transfer of asynchronous data between an asynchronous data source and a spreadsheet application program. In particular, the present invention provides an asynchronous data server program that receives a stream of asynchronous data from an asynchronous data source. The present invention also provides a spreadsheet application program that includes a new worksheet function that may be utilized to include asynchronous data received from the asynchronous data server program in a cell formula. A communications mechanism is also provided for facilitating communication between the spreadsheet application program and the asynchronous data server program.

If a request is received to utilize an asynchronous data element in a spreadsheet, the spreadsheet application program will instruct the asynchronous data server to provide it with updated values for the asynchronous data element. If the asynchronous data server program subsequently receives an updated value, the asynchronous data server program will notify the spreadsheet application program that a changed value for the data element is available. The spreadsheet application program will receive the notification that an updated value is available even if the program is busy recalculating the spreadsheet or performing other tasks.

The next time the spreadsheet application program has idle processing time following a notification that an update is available, the spreadsheet application program will determine whether a notification has been received from the asynchronous data server program indicating that an update is available. If an update is available, the spreadsheet application program will contact the asynchronous data server and request the update. The asynchronous data server program will then send the spreadsheet application program all of the updates it has received since the last time the spreadsheet application program requested updates.

Once the updated asynchronous data values have been received at the spreadsheet application program from the asynchronous data server, the spreadsheet application program will integrate the new values into the spreadsheet. The spreadsheet may then be recalculated with the new asynchronous data values. In one embodiment of the present invention, the spreadsheet application program will keep track of all of the asynchronous data values utilized in the spreadsheet. If certain values are not used in a recalculation, the spreadsheet application program will notify the asynchronous data server that updates for these values are no longer needed. If no asynchronous data values are utilized in a recalculation, the spreadsheet application program will indicate to the asynchronous data server program that it can safely shut down.

The present invention also provides a system, apparatus, and computer-readable medium for providing access to asynchronous data in a spreadsheet application program. Additional details regarding the operation of the present invention will become apparent from the detailed description that follows.

DETAILED DESCRIPTION OF AN ILLUSTRATIVE EMBODIMENT

As described briefly above, the present invention provides a method, system and apparatus for providing access to asynchronous data in a spreadsheet application program. In order to facilitate access to asynchronous data in a spreadsheet application program, a new worksheet function is introduced that provides easy access to asynchronous data. Additionally, a design for an asynchronous data server program is provided that communicates with an asynchronous data source. The asynchronous data source provides a stream of asynchronous data to the asynchronous data server program.

When the new worksheet function is utilized in the spreadsheet application program to request asynchronous data, a notification is provided to the asynchronous data server program requesting updated asynchronous data. When the asynchronous data server program needs to provide an update to the spreadsheet application program, it notifies the spreadsheet application program that an update is available. This notification may be received by the spreadsheet application program even if the spreadsheet application program is busy recalculating a spreadsheet, displaying a modal dialog box, or performing other tasks. The next time the spreadsheet application program has idle processing time, the spreadsheet application program determines if a notification was received from the asynchronous data server program indicating that an update is available. If such a notification was received, the spreadsheet application program transmits a request to the asynchronous data server program for the updated asynchronous data. In response, the asynchronous data server program provides the updated asynchronous data to the spreadsheet application program. In this manner, an orderly notification of available data and transmission of the asynchronous data may take place.

Figure 1A:
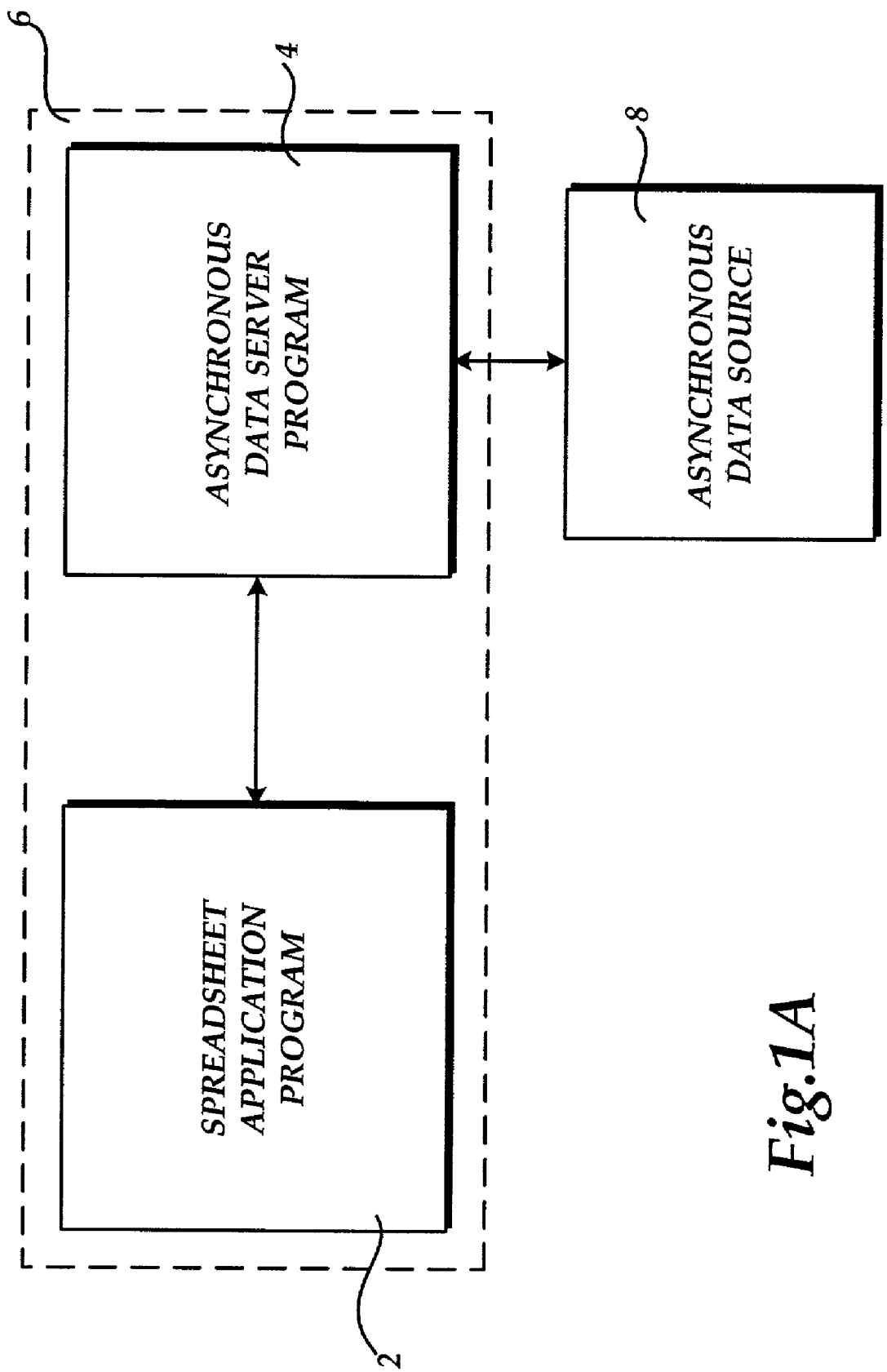
FIG. 1A is a block diagram showing an illustrative computer architecture for providing access to asynchronous data in a spreadsheet application program according to one actual embodiment of the present invention.

Turning now to the drawings, in which like numerals represent like elements, an illustrative embodiment of the present invention may be described. FIG. 1A shows an illustrative computer architecture for providing access to asynchronous data in a spreadsheet application program according to one actual embodiment of the present invention. In particular, FIG. 1A illustrates a conventional personal computer 6 executing a spreadsheet application program 2 and an asynchronous data server program 4.

The spreadsheet application program 2 comprises a standard spreadsheet application program such as the EXCEL spreadsheet application program available from MICROSOFT CORPORATION of Redmond, Wash. As will be described in greater detail below, the spreadsheet application program 2 includes a worksheet function for accessing asynchronous data available from the asynchronous data server program 4. Moreover, the spreadsheet application program 2 supports an object interface for facilitating communication with, and transferring asynchronous data from, the asynchronous data server program 4. Additional details regarding the spreadsheet application program 2 will be described in greater detail below with respect to FIGS. 4 and 5–7.

As shown in FIG. 1A, the asynchronous data server program 4 may execute on the same personal computer 6 as the spreadsheet application program 2. The asynchronous data server program 4 may comprise a dynamic-link library or an executable that is executed on the personal computer 6. As will be described in greater detail below with reference to FIG. 1B, the asynchronous data server program 4 may also comprise an executable file that runs on a separate computer. According to the embodiment of the present invention shown in FIG. 1A, the asynchronous data server program 4 is a component object model ("COM") automation server that implements an interface for communicating with the spreadsheet application program 2. The interface provided by the asynchronous data server program 4 is utilized by the spreadsheet application program 2 to gain access to asynchronous data available from the asynchronous data source 8.

As discussed briefly above, the asynchronous data source 8 provides a stream of asynchronous data to the asynchronous data server program 4. Asynchronous data is data that does not update according to a predefined schedule. For instance, one type of asynchronous data is real time data, such as stock quotes, manufacturing statistics, World Wide Web ("WWW" or "Web") server loads, or warehouse activity. The asynchronous data server program 4 communicates with the asynchronous data source 8 to receive the available asynchronous data. The asynchronous data server program 4 also provides an interface to the asynchronous data source 8 to the spreadsheet application program 2. Additional details regarding the construction and operation of the asynchronous data server program 4 will be described below with reference to FIGS. 3 and 5–7.

Figure 1B:
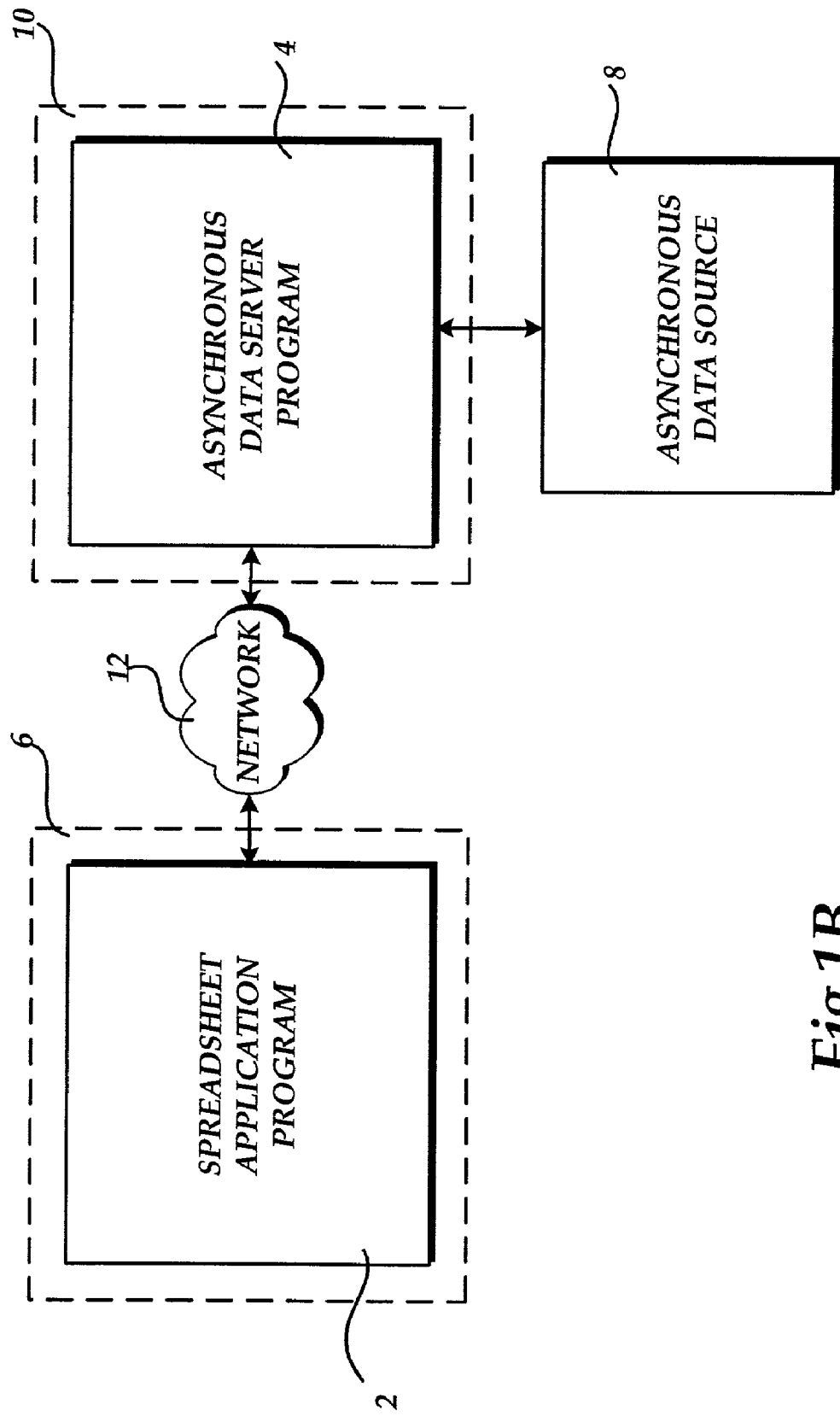
FIG. 1B is a block diagram showing an illustrative computer architecture for providing access to asynchronous data in a spreadsheet application program according to another actual embodiment of the present invention.

Referring now to FIG. 1B, another illustrative computer architecture for providing access to asynchronous data in a spreadsheet application program will be described. As shown in FIG. 1B, the spreadsheet application program 2 and the asynchronous data server program 4 may be executed on different computers. In particular, the spreadsheet application program may be executed on personal computer 6, while the asynchronous data server program is executed on the personal computer 10. In this embodiment of the present invention, the asynchronous data server program 4 is instantiated as a distributed component object model ("DCOM") object. The asynchronous data server program 4 communicates with the spreadsheet application program 2 through a network 12. The object interface is provided to the spreadsheet application program 2 by the asynchronous data server program 4 in exactly the same way as when executing on a single machine as described above with respect to FIG. 1A. The only difference being that the asynchronous data server program 4 is instantiated using DCOM on the personal computer 10 rather than on the personal computer 6. It should be appreciated that other technologies for instantiating software objects on remote computers may also be utilized to implement the asynchronous data server program 4.

Figure 2:
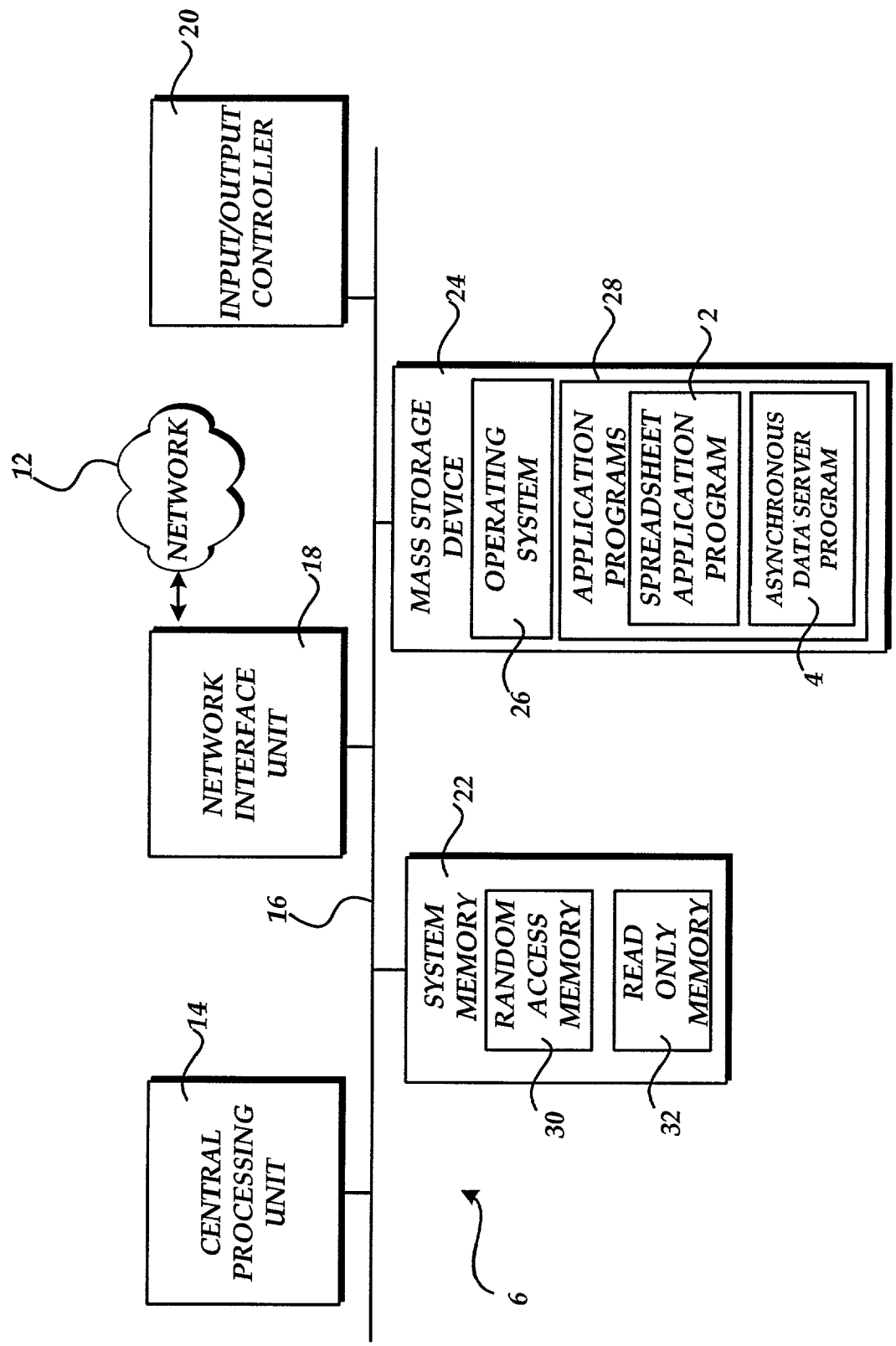
FIG. 2 is a block diagram showing an illustrative computer architecture for a personal computer utilized to execute a spreadsheet application program and an asynchronous data server program in an actual embodiment of the present invention.

Turning now to FIG. 2, an illustrative computer architecture for the personal computer 6 will be described. The computer architecture shown in FIG. 2 illustrates a conventional personal computer, including a central processing unit 14 ("CPU"), a system memory 22, including a random access memory 30 ("RAM") and a read-only memory ("ROM") 32, and a system bus 16 that couples the memory to the CPU 14. A basic input/output system ("BIOS") containing the basic routines that help to transfer information between elements within the personal computer 6, such as during startup, is stored in the ROM 32. The personal computer 6 further includes a mass storage device 24 for storing an operating system 26 and application programs 28. Although a conventional personal computer is shown in FIG. 2, the invention may be practiced on other types of computing devices, such as server computers, network workstations, handheld computing devices and the like.

The mass storage device 24 is connected to the CPU 14 through a mass storage controller (not shown) connected to the bus 16. The mass storage device 24 and its associated computer-readable media, provide non-volatile storage for the personal computer 6. Although the description of computer-readable media contained herein refers to a mass storage device, such as a hard disk or CD-ROM drive, it should be appreciated by those skilled in the art that computer-readable media can be any available media that can be accessed by the personal computer 6. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the personal computer 6.

As described briefly above, the personal computer 6 operates in a networked environment using logical connections to one or more remote computers through a network 12, such as the Internet. The personal computer 6 may connect to the network 12 through a network interface unit 18 connected to the bus 16. The personal computer 6 may also include an input/output controller 20 for receiving and processing input from a number of devices, including a keyboard or mouse. Similarly, the input/output controller 20 may provide output to a display screen, a printer, or other type of output device.

A number of program modules may be stored in the mass storage device 24 and RAM 30 of the personal computer 6, including an operating system 26 suitable for controlling the operation of a personal computer, such as the WINDOWS XP operating system from MICROSOFT CORPORATION of Redmond, Wash. Other suitable operating environments may also be used to practice the invention, such as the MACINTOSH operating environment from APPLE COMPUTER. The mass storage device 24 and RAM 30 may also store one or more application programs 28. In particular, the mass storage device 24 and RAM 30 may store a spreadsheet application program 2, and an asynchronous data server program 4. As discussed above, the spreadsheet application program 2 and the asynchronous data server program 4 may execute on the same or different computers.

The spreadsheet application program 2 includes a new worksheet function that provides access to asynchronous data available from the asynchronous data server program 4 in a spreadsheet. The syntax of the worksheet function is RTD (arguments), and takes as arguments a string representing the program ID of an asynchronous data server program 4 that has been registered on the personal computer 6 and a server name representing the name of the computer on the network on which the asynchronous data server program 4 is executing. If the asynchronous data server program 4 is executing on the same computer as the spreadsheet application program 2, the server name argument should be left blank. The worksheet function also takes as parameters string arguments that identify a data element, or topic, to be sent to the spreadsheet application program 2 by the asynchronous data server program 4. The string arguments together represent a unique piece of asynchronous data. For instance, the worksheet function "=RTD ("MYRTDSERVER.PROGID", "MYSERVER", "NASDAQ", "MSFT", "BID_PRICE")" identifies a bid price for the NASDAQ stock represented by the symbol MSFT as an asynchronous data item to be included in the target cell of the spreadsheet. In this example, the string topics "NASDAQ," "MFST," and "BID_PRICE" identify a unique leaf node in a hierarchy of all NASDAQ stocks. Other types of data may be identified in a similar fashion.

When a user includes a RTD worksheet function in a spreadsheet, such as that described above, the spreadsheet application program 2 instantiates the asynchronous data server program 4. Once the asynchronous data server program 4 has been instantiated, the spreadsheet application program 2 calls a method on the asynchronous data server program 4 and passes to the asynchronous data server program 4 a callback object exposing several methods implemented by the spreadsheet application program 2. The spreadsheet application program 2 also identifies to the asynchronous data server program 4 the topics or asynchronous data elements, that it would like to receive. The asynchronous data server program 4 maintains a list of asynchronous data topics that should be provided to the spreadsheet application program 2.

The asynchronous data server program 4 also monitors its asynchronous data source 8 for updates to any of the monitored real time data elements. When the asynchronous data server program 4 determines that one of the monitored data elements has been updated, it calls a specific method on the callback object that was passed to it by the spreadsheet application program 2. The next time the spreadsheet application program 2 has idle processing time after the method has been called, the spreadsheet application program 2 will call another method on the interface provided by the asynchronous data server program 4. This method allows the asynchronous data server program 4 to transmit to the spreadsheet application program 2 the updates it has received since the last time the spreadsheet application program 2 queried for updates. Additional details regarding the communication between the spreadsheet application program and the asynchronous data server program 4 will be described below with reference to FIGS. 3–7.

Figure 3:
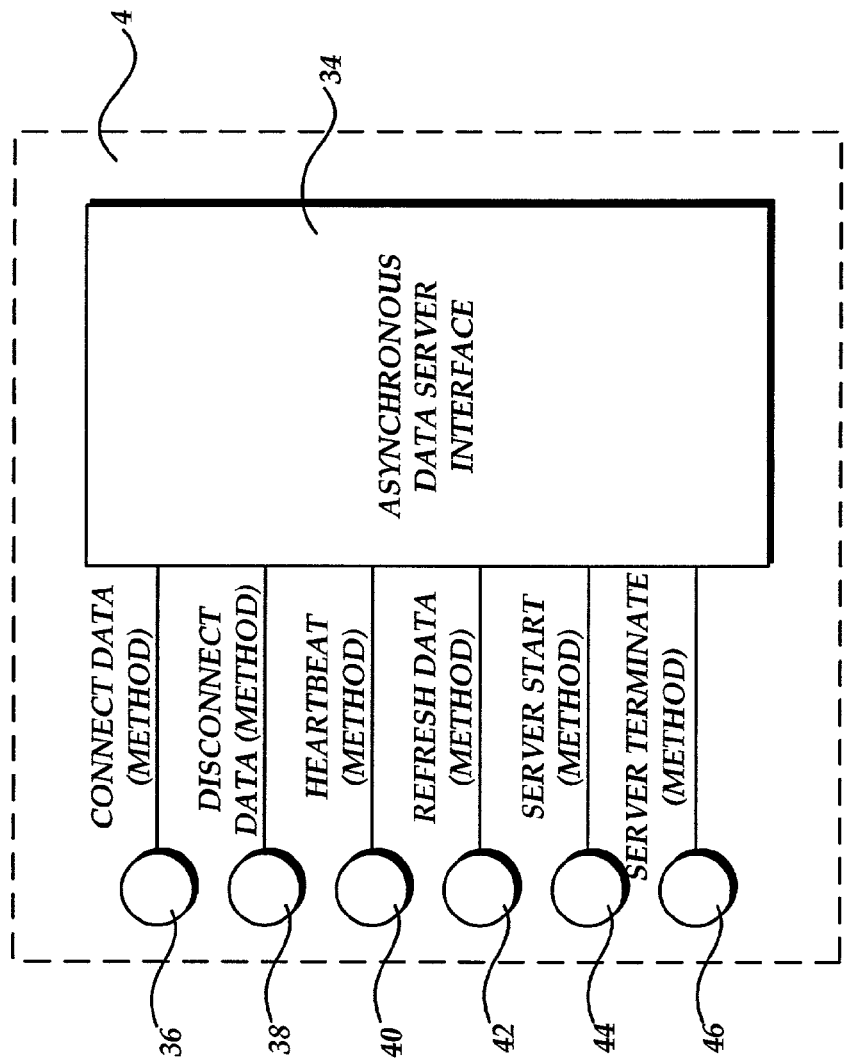
FIG. 3 is a block diagram showing an object interface provided by an asynchronous data server program according to one embodiment of the present invention.

Referring now to FIG. 3, aspects of the object interface provided by the asynchronous data server program 4 will be described. As shown in FIG. 3, the asynchronous data server program 4 provides an asynchronous data interface 34. The asynchronous data server interface exposes six methods that may be called by the spreadsheet application program 2. These methods may be called on the asynchronous data server interface 34 regardless of whether the asynchronous data server program 4 is executing on the same or a different machine from the spreadsheet application program 2.

The asynchronous data server interface exposes a connect data method 36. The connect data method is called by the spreadsheet application program 2 when it requests new asynchronous data topics from the asynchronous data server program 4. The connect data method 36 takes as parameters a topic ID that represents a unique, arbitrary value automatically assigned by the spreadsheet application program 2 to identify a given topic, a string parameter that uniquely identifies the topic, and a Boolean value that indicates whether or not new asynchronous data values should be retrieved. After calling the connect data method 36, the next time the spreadsheet application program 2 is idle, the asynchronous data server program 4 will call a refresh data method on an object interface exposed by the spreadsheet application program 2 automatically. Additional details regarding the refresh data method will be described below with reference to FIG. 4.

The asynchronous data server interface 34 also exposes a disconnect data method 38. The disconnect data method 38 is called by the spreadsheet application program 2 when it no longer requires a specific topic, or data element. The disconnect data method 38 takes as a parameter a value that represents the arbitrary, unique value automatically assigned by the spreadsheet application program 2 when it first called the connected data method 36 and identified the particular asynchronous data topic.

The asynchronous data server interface 34 also exposes a heartbeat method 40. The heartbeat method 40 is called by the spreadsheet application program 2 when a predetermined amount of time has passed since the last time the spreadsheet application program 2 was able to successfully retrieve updated data from the asynchronous data server program 4 via the refresh data method 42, described below. The heartbeat method 40 allows the spreadsheet application program 2 to determine whether the asynchronous data server program 4 is still responding. If the asynchronous data server program 4 is not responding, the spreadsheet application program 2 may display a dialog box or other type of notification informing a user that the asynchronous data server program 4 is not responding. The spreadsheet application program 2 may also attempt restart the asynchronous data server program 4. The heartbeat method 40 may return a value indicating either that the asynchronous data server program 4 is still executing properly or that the connection with the asynchronous data server program 4 no longer exists. If the asynchronous data server program 4 is in such a state that it is unable to process the heartbeat method 40, the spreadsheet application program 2 will assume the asynchronous data server program 4 is not responding after the standard time-out expires.

The asynchronous data server interface 34 also exposes a refresh data method 42. This method is called by the spreadsheet application program 2 to retrieve new values for data elements from the asynchronous data server program 4. This method returns a two dimensional array of Variant values. The first dimension represents a list of topic identifiers, which map to the topic ID parameter provided when the connect data method 36 is first called, as described above. The second dimension represents the actual updated data values associated with the particular topic IDs. The refresh data method 42 is only called by the spreadsheet application program after the asynchronous data server program 4 has called an update notify method provided by the spreadsheet application program 2 on the object interface exposed by the spreadsheet program application 2. Additional details regarding the update notify method will be described below with reference to FIG. 4.

The asynchronous data server interface 34 also exposes a server start method 44. This method is called when the spreadsheet application program 2 requests the first topic, or data element, from the asynchronous data server program 4. This method returns a value indicating either a successful request or a failed request. A call to the server start method 44 is typically followed by a call to the connect data method 36, described above.

The server start method 44 takes as a parameter a callback object that the asynchronous data server program 4 uses to notify the spreadsheet application program 2 that it should gather updates from the asynchronous data server program 4. Additional details regarding the callback object and the update notify method will be described below with reference to FIG. 4.

The asynchronous data server interface also exposes a server terminate method 46 that may be called by the spreadsheet application program 2 when it no longer requires topics from the asynchronous data server program 4. A call to the server terminate method 46 will inform the asynchronous data server program 4 that it can safely now terminate all of its operations.

Figure 4:
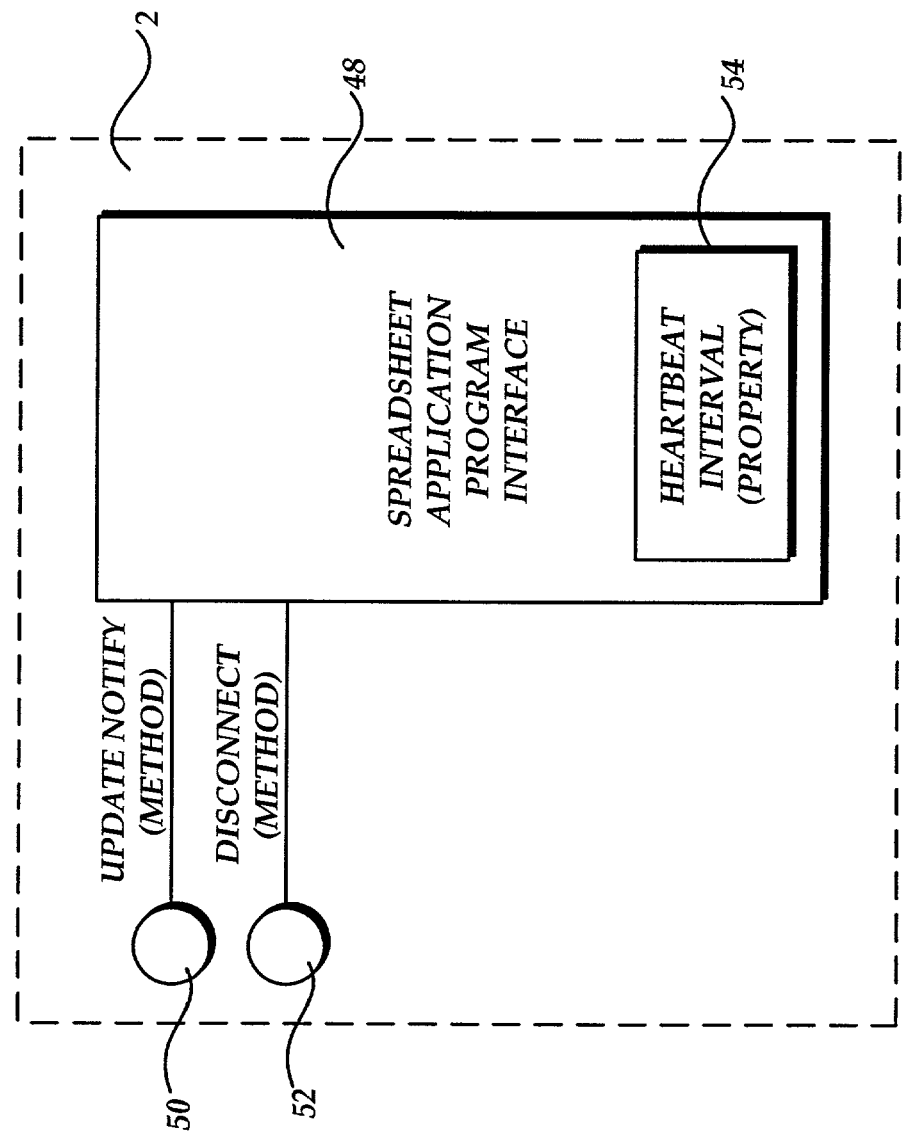
FIG. 4 is a block diagram showing an object interface provided by a spreadsheet application program according to one embodiment of the present invention.

Referring now to FIG. 4, an object interface provided by the spreadsheet application program 2 in one embodiment of the present invention will be described. As shown in FIG. 4, the spreadsheet application program 2 provides an application program interface 48. In the actual embodiment of the present invention described herein, the application program interface 48 includes an update notify method 50. The update notify method 50 is called by the asynchronous data server program 4 when it has a new asynchronous data value for one or more topics. The update notify method 50 may be called by the asynchronous data server program 4 in an asynchronous manner and may be called even when the spreadsheet application program 2 is busy processing.

The spreadsheet application program interface 48 also includes a disconnect method 52. The disconnect method may be called by the asynchronous data server program 4 to indicate to the spreadsheet application program 2 that the asynchronous data server program 4 will be disconnecting. In response to this event being called, the spreadsheet application program 2 may take action prior to losing its connection with the asynchronous data server program 4. This allows for an orderly shut down of communication between the asynchronous data server program 4 and the spreadsheet application program 2 and gives the spreadsheet application program 2 an opportunity to inform the user that the connection to the asynchronous data server program 4 has been lost.

The spreadsheet application program interface 48 also exposes a heartbeat interval property 54. This property returns or sets the time interval that the spreadsheet application program 2 waits before calling the heartbeat method 40 to verify whether or not the asynchronous data server program 4 is still responding. According to the actual embodiment of the invention described herein, the heartbeat interval property 54 returns a Long value that represents the number of milliseconds the spreadsheet application program 2 will wait before calling the heartbeat method 40. The update notify method 50, disconnect method 52, and heartbeat interval property 54 will be described in greater detail below with respect to FIGS. 5–7.

Figure 5:
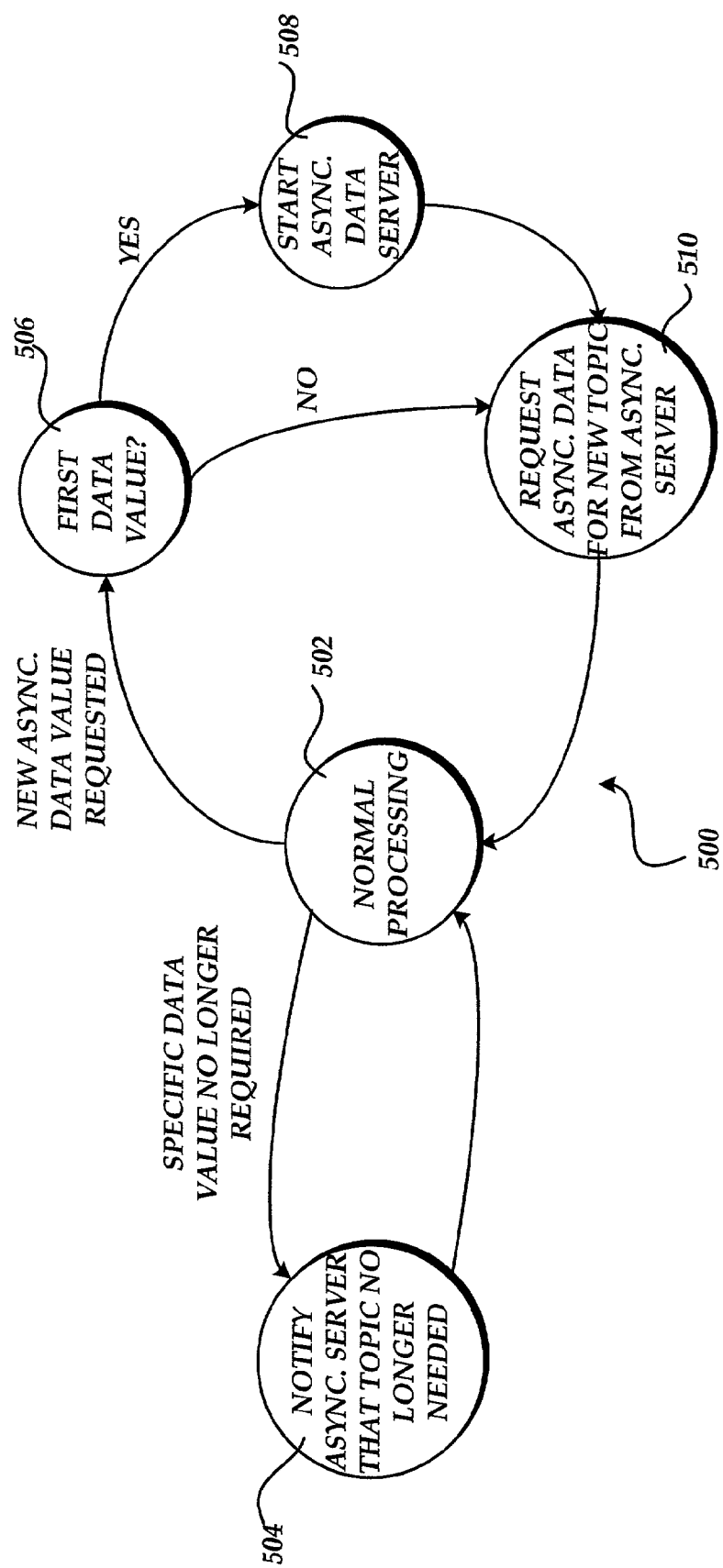
FIG. 5 is a state diagram showing the interaction between a spreadsheet application program and an asynchronous data server program according to one actual embodiment of the present invention.

Referring now to FIG. 5, a state diagram will be described that illustrates various aspects of the interaction between the spreadsheet application program 2 and the asynchronous data server program 4. The state machine 500 begins at state 502, where the spreadsheet application program 2 performs its normal processing. If, as part of its normal processing of a spreadsheet, the spreadsheet application program 2 encounters a worksheet function for incorporating data from the asynchronous data server program 4, the state machine 500 transitions to state 506. At state 506, a determination is made by the spreadsheet application program 2 as to whether data is being requested from the asynchronous data server program 4 for the first time. If data is being requested from the asynchronous data server program 4 for the first time, the state machine 500 transitions to state 508 where the spreadsheet application program 2 instantiates the asynchronous data server program 4 and calls the start server method 44. The state machine 500 then transitions from state 508 to state 510.

If, at state 506, the spreadsheet application program 2 determines that data has previously been requested from the asynchronous data server program 4, the state machine 500 directly transitions to state 510. At state 510, the spreadsheet application program 2 requests asynchronous data for the new asynchronous data topic from the asynchronous data server program 4. The spreadsheet application program 2 does this by calling the connect data method 36 on the asynchronous data server program 4. As described above, the connect data method 36 takes as parameters a topic ID that represents a unique arbitrary value assigned by the spreadsheet application program 2 for the topic, a Variant value that uniquely identifies the topic, and a Boolean value indicating whether or not new values are to be retrieved. From state 510, the state machine 500 returns to state 502, where the spreadsheet application program 2 continues its normal processing routines.

At state 502, a determination is also made by the spreadsheet application program 2 as to whether a specific data topic previously requested from the asynchronous data server program 4 is no longer utilized in the current spreadsheet. If a specific data value is no longer required by the spreadsheet application program 2, the state machine 500 transitions to state 504. At state 504, the spreadsheet application program 2 notifies the asynchronous data server program 4 that the topic is no longer needed. This is accomplished by calling the disconnect data method 38 on the asynchronous data server program 4. The disconnect data method 38 takes as a parameter the topic ID for the value that is no longer needed. If the spreadsheet application program 2 determines that it no longer has any topics that it requires from this particular asynchronous data server program 4, it will call its server terminate method to indicate that the asynchronous data server program 4 may now safely shut down. From state 504, the state machine 500 returns to state 502 where the spreadsheet application program 2 continues its normal processing.

Figure 6:
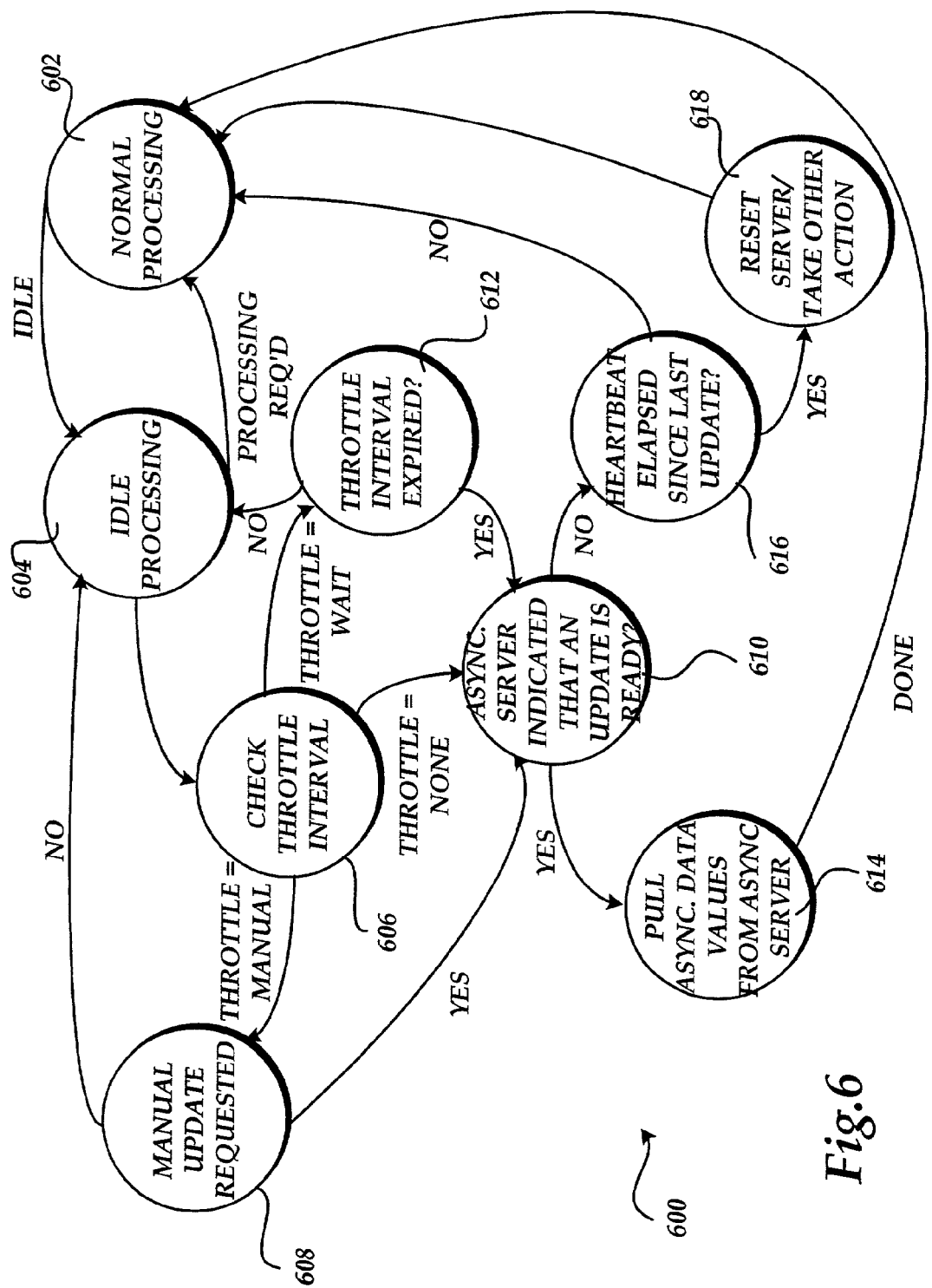
FIG. 6 is a state diagram showing the operation of a spreadsheet application program when accessing asynchronous data according to one embodiment of the present invention.

Referring now to FIG. 6, a state diagram will be described that illustrates the interaction between the spreadsheet application program 2 and the asynchronous data server program 4 when exchanging asynchronous data. The processing shown in FIG. 6 occurs after the asynchronous data server program 4 has been instantiated and the connect data method 36 has been called on the asynchronous data server program 4 by the spreadsheet application program 2.

The state machine 600 begins at state 602, where the spreadsheet application program 2 performs its normal processing. If the spreadsheet application program 2 becomes idle during its normal processing routine, the state machine 600 transitions to state 604. At state 604, the spreadsheet application program 2 performs any idle processing routines that it may have. As a part of its idle processing, the spreadsheet application program 2 provided herein transitions to state 606.

At state 606, the spreadsheet application program 2 retrieves and checks a throttle interval variable. The throttle interval variable may be programmatically set and determines the amount of time the spreadsheet application program 2 waits before checking whether the asynchronous data server program 4 has indicated that an updated asynchronous data value is ready. The throttle interval may be set for manual updates only, to check whenever possible, or to wait a specified number of milliseconds prior to checking whether the asynchronous data server program 4 has indicated that an update is ready. If the throttle interval is set for manual updates only, the state machine 600 transitions from state 606 to state 608. At state 608, a determination is made as to whether a manual update has been requested. If a manual update has not been requested, the state machine 600 returns to state 604. If a manual update has been requested, the state machine 600 transitions to state 610, described below.

If, at state 606, the spreadsheet application program 2 determines that the throttle interval has been set to wait, the state machine 600 transitions from state 606 to state 612. At state 612, the spreadsheet application program 2 checks if a throttle interval (specified in milliseconds) has expired yet for this particular asynchronous data server program 4. If it has, the state machine transitions to state 610, described below. Otherwise, the state machine transitions back to state 604.

If, at state 606 the spreadsheet application program 2 determines that the throttle interval has been set to zero, the state machine 600 transitions immediately to state 610. At state 610, the spreadsheet application program 2 determines whether the asynchronous data server program 4 has indicated that an update is available. This is accomplished by determining whether the update notify method 50 has been called by the asynchronous data server program 4. If the update notify method 50 has been called by the asynchronous data server program 4, the state machine 600 transitions to state 614.

At state 614, the spreadsheet application program 2 retrieves the asynchronous data values from the asynchronous data server program 4. The spreadsheet application program 2 retrieves the asynchronous data values by calling the refresh data method 42 on the asynchronous data server program 4. In response, the asynchronous data server program 4 returns the asynchronous data values that have been updated since the last call to the refresh data method 42. The spreadsheet application program 2 may then recalculate the spreadsheet. Alternatively, the spreadsheet application program 2 may recalculate only the spreadsheet values that changed as a result of the updated asynchronous data. From state 614, the state machine 600 returns to state 602.

If, at state 610, the spreadsheet application program 2 determines that the asynchronous data server program 4 has not indicated that an update is ready, the state machine 600 transitions to state 616. At state 616, the heartbeat interval property 54 is examined and a determination is made as to whether a timer associated with the heartbeat has elapsed since the last time that updated values were retrieved from the asynchronous data server program 4. If the time has not elapsed, this indicates that communication between the spreadsheet application program 2 and the asynchronous data server program 4 is operative. In this case, the state machine 600 transitions from state 616 to state 604. If the timer has elapsed, the state machine 600 transitions to state 618. At state 618, the spreadsheet application program 2 will call the heartbeat method 40 to determine whether or not the asynchronous data server program 4 is still operational. If it is not, the asynchronous data server program 4 may be reset or other action may be taken to reestablish communication with the asynchronous data server program 4. The user may also be notified of the interrupted data connection.

From state 618, the state machine 600 returns to state 604. At state 604, a determination is also made as to whether normal processing is required. If processing is required, the state machine 600 transitions from state 604 to state 602 where normal processing resumes.

Figure 7:
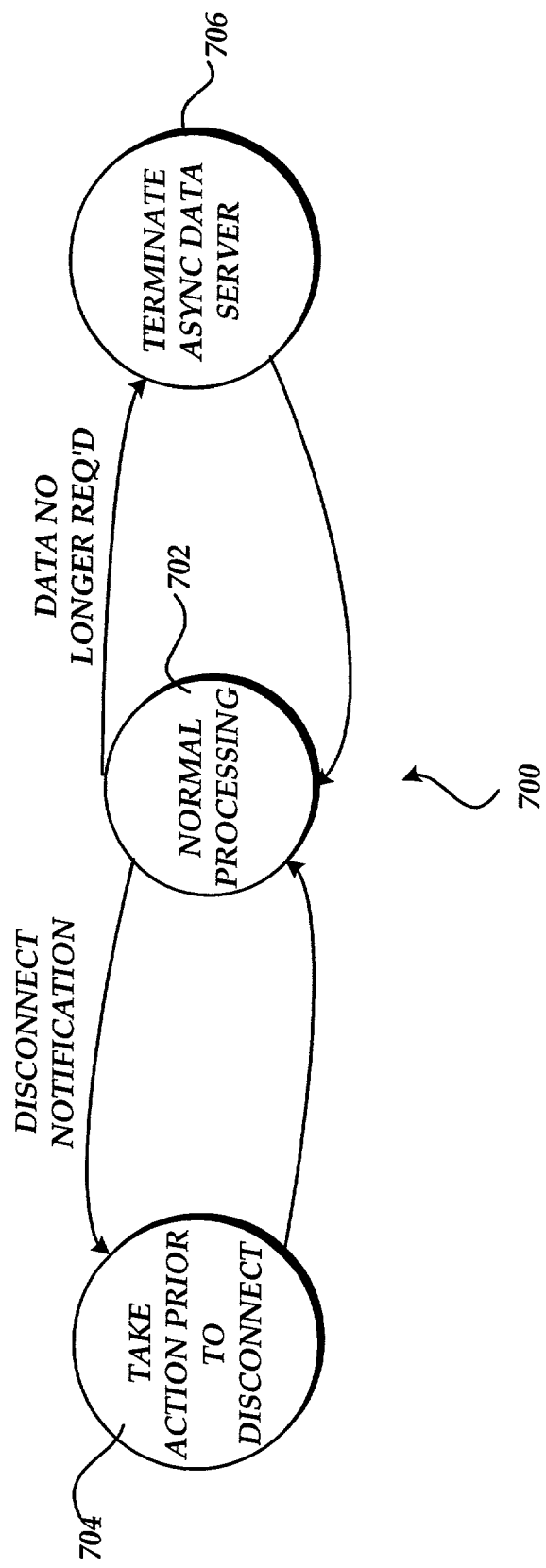
FIG. 7 is a state diagram showing the operation of a spreadsheet application program when disconnecting from an asynchronous data server according to one embodiment of the present invention.

Turning now to FIG. 7, a state machine 700 will be described that illustrates the operation of the spreadsheet application program 2 when disconnecting from the asynchronous data server program 4. The state machine 700 begins at state 702, where the spreadsheet application program 2 performs its normal processing. If, at state 702, it is determined that the disconnect method 52 has been called by the asynchronous data server program 4, the state machine 700 transitions to state 704. At state 704, the spreadsheet application program 2 takes any action necessary to ensure an order disconnect prior to the disconnection from the asynchronous data server program 4 and alerts the user that the connection to the asynchronous data server 4 has been lost. After the spreadsheet application program 2 has performed this processing, the state machine 700 transitions from state 704 back to state 702.

If, at state 702, the spreadsheet application program 2 determines that it no longer requires any asynchronous data values from the asynchronous data server program 4, the state machine 700 transitions from state 702 to state 706. At state 706, the spreadsheet application program 2 terminates the asynchronous data server program 4 by calling the server terminate method 46. In response to the calling of the server terminate method 46, the called instance of the asynchronous data server program 4 is terminated. The state machine 700 then returns from state 706 to state 702 where normal processing continues.

Based on the foregoing it should be appreciated that the present invention provides a method, system, and apparatus for providing access to asynchronous data in a spreadsheet application program. The above specification, examples and data provide a complete description of the manufacture, use, and composition of the invention. Since many embodiments of the invention can be made without departing from the spirit and scope of the invention, the invention resides in the claims hereinafter appended.

We claim:

1. A method for providing access to asynchronous data in a spreadsheet application program, comprising:
    receiving a request at said spreadsheet application program to access an asynchronous data element available from an asynchronous data source;
    exposing an interface at said spreadsheet application program for receiving a notification that a changed value for said data element is available;
    notifying an asynchronous data server that said spreadsheet application program should be notified at said interface in the event that a changed value for said data element is available;
    determining whether a notification has been received at said interface indicating that a changed value for said data element is available;
    in response to determining that the notification has been received at said interface, said interface at said spreadsheet application program configured to receive said notification when said spreadsheet application program cannot receive the changed value because it is busy recalculating a spreadsheet, contacting said asynchronous data server and requesting said changed value for said data element; and
    receiving said changed value for said data element from said asynchronous data server at said spreadsheet application program.

2. The method of claim 1, further comprising:
    recalculating a spreadsheet that includes said changed data value in response to receiving said changed value for said data element.

3. The method of claim 2, wherein said recalculation is limited to cells contained in said spreadsheet that depend upon said changed data value.

4. The method of claim 1, wherein said notification from said asynchronous data server indicating that a changed value for said data element is available is received asynchronously.

5. The method of claim 1, wherein said request at said spreadsheet application program to access an asynchronous data element is received through a worksheet time data function provided by said spreadsheet application program.

6. A computer-controlled apparatus capable of performing the method of claim 5.

7. The method of claim 1, further comprising:
maintaining a throttle interval value defining when said determination should be made regarding whether a notification has been received at said interface indicating that a changed value for said data element is available.

8. The method of claim 7, further comprising:
determining whether said throttle interval value is set for a manual update mode prior to determining whether a notification has been received at said interface indicating that a changed value for said data element is available; and
in response to determining that said throttle interval value is set for said manual update mode, determining whether a notification has been received at said interface indicating that a changed value for said data element is available only in response to a manual request.

9. A computer-controlled apparatus capable of performing the method of claim 8.

10. The method of claim 7, further comprising:
determining whether said throttle interval value is set for a constant update mode prior to determining whether a notification has been received at said interface indicating that a changed value for said data element is available; and
in response to determining that said throttle interval value is set for said constant update mode, determining whether a notification has been received at said interface indicating that a changed value for said data element is available whenever said spreadsheet application program is idle.

11. A computer-controlled apparatus capable of performing the method of claim 10.

12. The method of claim 7, further comprising:
determining whether said throttle interval value is set to wait a predetermined amount of time prior to determining whether a notification has been received at said interface indicating that a changed value for said data element is available; and
in response to determining that said throttle interval value is set to wait a predetermined amount of time, determining whether a notification has been received at said interface indicating that a changed value for said data element is available only after waiting said predetermined amount of time.

13. A computer-controlled apparatus capable of performing the method of claim 12.

14. A computer-controlled apparatus capable of performing the method of claim 7.

15. The method of claim 1, further comprising:
determining whether a heartbeat value has elapsed since a previous update was received from said asynchronous data server in response to determining that no notification has been received at said interface; and
restarting said asynchronous data server in response to determining that said heartbeat value has elapsed.

16. A computer-controlled apparatus capable of performing the method of claim 15.

17. A computer-controlled apparatus capable of performing the method of claim 1.

18. A computer system for providing access to asynchronous data in a spreadsheet application program, comprising:
a spreadsheet application program operative to receive a request to access an asynchronous data element, to expose an interface at said spreadsheet application program for communicating with an asynchronous data server, and to notify said asynchronous data server that notifications should be provided at said interface in the event that a changed value for said data element is received, said interface at said spreadsheet application program configured to receive said notifications when said spreadsheet application program cannot receive the changed value because it is busy recalculating a spreadsheet; and
an asynchronous data server operative to receive said data element from an asynchronous data source, to receive said notification request from said spreadsheet application program, to determine whether a value for said data element has changed, and to asynchronously notify said spreadsheet application program at said interface in response to determining that said data value has changed.

19. The computer system of claim 18, wherein said spreadsheet application program is further operative to receive said notification from said asynchronous data server at said interface and, in response to receiving said notification, to contact said asynchronous data server and request said changed value for said data element.

20. The computer system of claim 19, wherein said spreadsheet application program is further operative to incorporate said changed value for said data element into a spreadsheet and to recalculate said spreadsheet based upon only said changed value.

21. A computer-readable medium comprising computer-executable instructions which, when executed by the computer, cause the computer to:
maintain an interface for use by a spreadsheet application program through which a notification is received indicating that an asynchronous data server has an asynchronous data value available for said spreadsheet application program, said interface at the spreadsheet application program configured to receive said notification when said spreadsheet application program cannot receive the changed value because it is busy recalculating a spreadsheet; and to
maintain an interface at said asynchronous data server for communicating with said spreadsheet application program, said interface maintained at said asynchronous data server supporting a refresh data method which, when called by said spreadsheet application program, causes the asynchronous data server to transmit said asynchronous data value to said spreadsheet application program.

22. The computer-readable medium of claim 21, wherein said interface maintained at said asynchronous data server further supports a connect data method that may be called by said spreadsheet application program to request a new asynchronous data value from said asynchronous data server.

23. The computer-readable medium of claim 21, wherein said interface maintained at said asynchronous data server further supports a disconnect data method that may be called by said spreadsheet application program to inform said asynchronous data server that said spreadsheet application program no longer requires a notification indicating that said asynchronous data server has a data value available for said spreadsheet application program.

24. The computer-readable medium of claim 21, wherein said interface maintained at said asynchronous data server further supports a heartbeat method that may be called by said spreadsheet application program to determine whether said asynchronous data server is active.

25. The computer-readable medium of claim 21, wherein said interface maintained at said asynchronous data server further supports a server start method that may be called by said spreadsheet application program to start said asynchronous data server, said server start method taking as a parameter a callback object implementing said interface maintained by said spreadsheet application.

26. The computer-readable medium of claim 21, wherein said interface maintained at said asynchronous data server further supports a server terminate method that terminates said asynchronous data server in the event that said spreadsheet application program no longer requires data values from said asynchronous data server.

* * * * *